July 29, 1941.  G. L. JONES ET AL  2,250,869

MEANS FOR WELDING RAILS

Filed Oct. 15, 1937  7 Sheets-Sheet 1

INVENTORS
G. LESTER JONES
CHARLES B. ROEDE
BY Joseph H. Lipschutz
ATTORNEY

July 29, 1941.   G. L. JONES ET AL   2,250,869
MEANS FOR WELDING RAILS
Filed Oct. 15, 1937   7 Sheets-Sheet 2

INVENTORS
G. LESTER JONES
CHARLES B. ROEDE
BY
Joseph H. Lipschutz
ATTORNEY

INVENTORS
G. LESTER JONES
CHARLES B. ROEDE
BY Joseph H. Lipschutz
ATTORNEY

July 29, 1941.　　G. L. JONES ET AL　　2,250,869
MEANS FOR WELDING RAILS
Filed Oct. 15, 1937　　7 Sheets-Sheet 4

INVENTORS
G. LESTER JONES
CHARLES B. ROEDE
BY Joseph H. Lipschutz
ATTORNEY

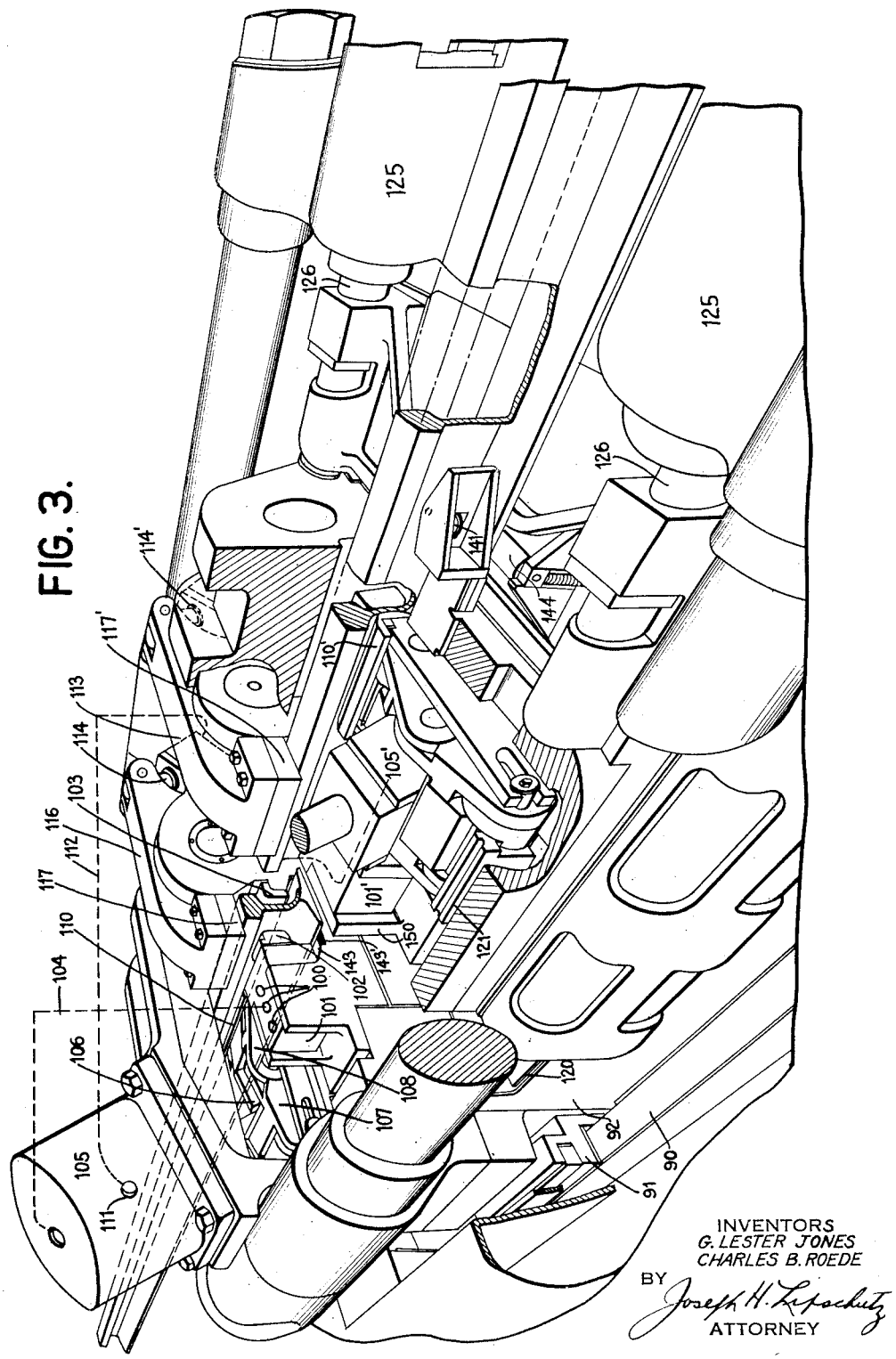

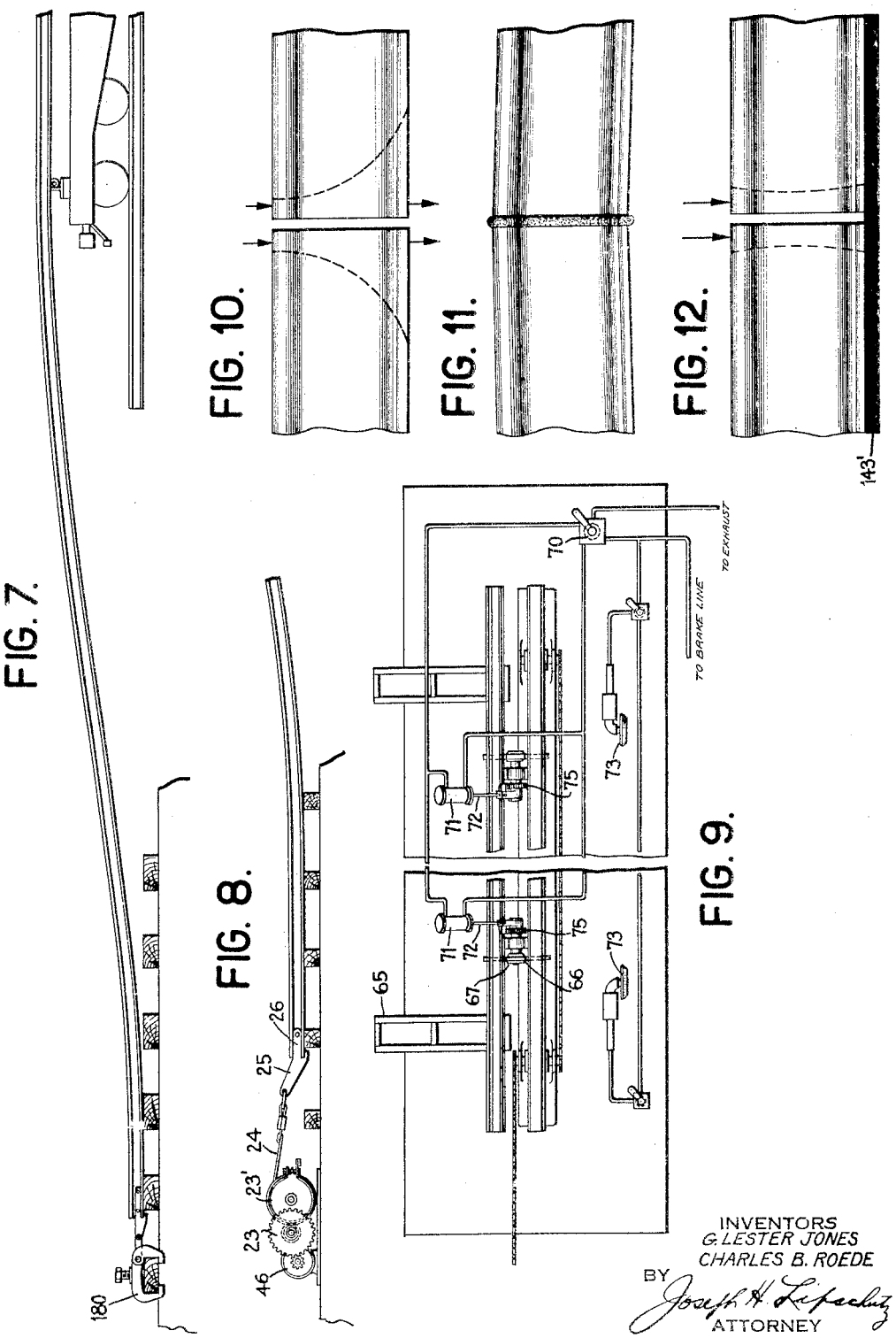

Patented July 29, 1941

2,250,869

UNITED STATES PATENT OFFICE 2,250,869

MEANS FOR WELDING RAILS

George Lester Jones, Garden City, N. Y., and Charles B. Roede, Ridgefield, N. J., assignors to Sperry Products, Inc., Brooklyn, N. Y., a corporation of New York Application October 15, 1937, Serial No. 169,222

9 Claims. (Cl. 219—4)

This invention relates to a method and means for the mass production of welded rails. While welding of rails has been known for many years, it is only recently that the necessity for mass production has arisen, by reason of the fact that certain railroads have begun to adopt continuous rail as standard practice, and it is not possible by methods heretofore employed to weld substantially all of the rails in railroads of any length efficiently and economically. It is therefor the primary object of our invention to provide a method and means for economically and efficiently welding rails in large numbers on a mass production basis.

The welding of rails presents many problems which are specific to this art and which require special solutions. Thus, for instance, it is not desirable to set up a welding factory for the purpose of welding long rail lengths, let us say on the order of half a mile each, and then transport these long rails to whichever point on a railroad it is desired to install them. The reason for this is that when rails half a mile long are loaded on a string of flat cars for transportation as freight, the rails serve to make a rigid unit out of the string of flat cars, which prevents movement of said cars in the manner of ordinary freight cars. In ordinary freight trains there is flexibility between the cars of the train which permits shock and various other large impact forces to be taken up with a cushioning effect. This is not the case where all of the units are rigidly tied together by rails extending thereover. Therefore it would not be possible to haul long freight trains loaded with long rail lengths in regular freight traffic at regular freight speeds, and thus ordinary freight schedules would be disrupted by the movement of such a train since it would have to be moved relatively slowly so as to reduce the shocks which would be transmitted thereto if such a train were hauled in the regular manner as an ordinary freight train.

Furthermore, in ordinary freight trains, if one car proves to be defective, as for instance if an axle breaks or bearings burn out, as is frequently the case, it is merely necessary to withdraw the defective car from the train and the train then proceeds as before. Should the same thing happen to a train that is loaded with long rail lengths, this would be impossible, or, at best, extremely difficult to remedy because the individual car cannot be withdrawn from the train, by reason of the long rail lengths which unite all of the cars into a rigid unit. Manufacture of long rail lengths at a single point in a stationary factory is therefore impractical, especially in the case of larger railroads with lines extending for several hundreds and in some cases several thousands of miles.

Similarly, it is impractical to transport the necessary equipment for mass production of welded rail successively to a plurality of points along the railroad in order to cut down the amount of rail transportation which would then be necessary. The reason for this is that the equipment for mass production of rails is such that it would be inefficient to set up such temporary factories at a plurality of points. Thus, for instance, the power consumed in the flash butt welding of rails is on the order of 1000 H. P., and the power plant for the generation of such power is so bulky and heavy that the mere transportation and installation of such power equipment at a plurality of points would vastly increase the expense and lower the efficiency of the operation. Furthermore, as will be apparent from the following description of what constitutes an adequate assembly for the mass production of welded rail, the setting up of such a power plant at a temporary point would involve prohibitive expense. This is especially true since the equipment would have to be set up at many points along the railroad trackage, for otherwise there would be the same problem as described above, namely, transportation of the welded rails for long distances.

Applicants believe that they have solved the problems inherent in mass production of welded rail by designing a mobile rail welding train which is capable of travelling under its own tractive power and generating the power necessary for the welding operation. The said train provides everything that is necessary for the manufacture of welded rail in quantity at points nearest to the points where such rails will be laid in track, thus cutting down to a minimum the distances through which such rails must be shipped before being laid in track.

Furthermore, applicants' invention consists in employing for the combined tractive power and welding power generating means, the ordinary steam locomotive which may be found on any railroad, and thus eliminates the expense which would otherwise be incurred in any such equipment. When it is realized that approximately 1000 H. P. must be generated for the welding operation, in addition to providing tractive power for the train, it can readily be understood that the additional expense which would be incurred if a separate power plant had to be purchased by the railroad would be so great as to add considerably to the cost of welding operation and might even be prohibitive in the case of many railroads. By designing a system which enables the roads to employ mechanisms which they already possess, the cost of rail welding is reduced for the railroads to such a point as to make it practical and economical where it might otherwise be prohibitive.

A further object of applicants' invention is to provide a rail welding train consisting of a plurality of units whereby the entire rail welding process, including the generation of the necessary power, supply of rails to be welded, the welding proper, heat treating, grinding, and storing of rails, may be performed.

In the mass production of rail welds, it will be realized that standard rail lengths are continuously being fed into the welding mechanism to be welded end to end to form the welded rail lengths. One of the most serious problems which confronts those who attempt to weld rails on such a mass production basis is due to the fact that, although rails appear to be of constant cross-section, this is not actually the case. Due to the method by which rails are rolled, it is found that there is substantial variation in the cross-section of rails and unless unusual precautions are taken to match the rail sections it will be found that the rails are joined out of alignment with each other with parts projecting as much as ⅛ to ¼ of an inch, so that even after grinding the continuity of the rail is seriously impaired. On the other hand, if time is taken to match up the sections so that they will be in alignment before welding takes place, then it is found that so much time is consumed as to seriously impair the economy of operation of the welding mechanism. It is therefore one of the principal objects of applicants' invention to provide a method and means whereby rails may be quickly placed in substantial alignment without adding to the total time consumed by the welding operation.

In order that rails may be butt welded, it is of course necessary that adjacent rail ends be gripped firmly between gripping dies in order that the necessary force may be applied to move the rails together so as to effect the welding operation. The amount of force which is expended in holding the adjacent rail ends in gripping dies is so great that after the weld is completed and the gripping dies are released it is found that the rail springs back to a different position. It is therefore a further object of applicants' invention to provide a method and a means whereby the portions of the rails adjacent the weld are enabled to maintain the aligned position which they occupy at the time of welding and thus prevent such rail portions from springing out of alignment when the gripping dies are released.

Since such a rail welding train as applicants herein describe is for the purpose of producing rails which may be as much as half a mile or more in length, it is obvious that such a train must have considerable length. One of the problems thus created is the movement of said rail lengths along said train to final storage position. This is effected by a winch and cable mechanism, but it will be readily understood that in hauling such long rail lengths by means of a winch and cable, considerable stresses will be set up in said cable which may cause the rail lengths to be hauled out of the welding machine at undesirably rapid speeds at times. It is an object of applicants' invention, therefore, to provide means whereby the said cable is maintained relatively free of such abnormal stresses at all times.

It is still a further object of applicants' invention to provide a rail welding train of the great lengths described which will nevertheless be completely under the control of a single operator at the welding machine. Said control comprises the feeding of the rails into the machine and the movement of the welded rail out of the welding mechanism and along the storage cars to storage position.

In the rail butt welding process there is formed a substantial flash or butt at the welded portion consisting of metal which has been squeezed out during the butting movement. Since the rails are fed along on guiding plates and in relation to fixed lateral dies, it is obvious that some provision must be made whereby the said butt or flash may clear the said fixed dies, and it is one of the objects of this invention to provide means whereby the rail is given the necessary movement after a weld is formed so that it may clear the fixed dies and the bed plates without injuring the same.

As stated in the preceding paragraph, a substantial flash or butt is formed at the welded portion consisting of excess metal squeezed out during the butting movement. This excess metal must be removed eventually, at least from certain parts of the rail section, and it is an object of our invention to provide means whereby part or all of this excess metal may be removed by a shearing mechanism while the rail is still held in the welding machine. Such removal of the excess metal by shearing will not obviate the necessity for the mechanism described in the preceding paragraph since the sharp edges which project after shearing are such as to injure any ties or base-plates with which they may come in contact.

The passage of the rail from the supply car into the welding car and the welding machine may result in the rail scoring the bed-plates upon which the rails are clamped in the welding machine during the welding operation. For this reason it is an object of our invention to provide mechanism for maintaining the rail out of contact with said bed-plates during the movement of the rail into and out of the welding machine.

While it is an object of our invention to provide means for making welded rails in long lengths which may then be shipped to any desired points and welded together when placed in position on the track, it is another object of our invention to provide a modification thereof wherein instead of storing the welded rail lengths on storage cars, a single continuous rail may be fed off the end of the welding train directly on to the ground either into track or adjacent the track where the rail is to be laid. This avoids the necessity of joining such sections by other welding means in track.

In the flash butt welding of rails by electric current it has been found that unless the parts of the rail cross-sections are evenly heated there is a tendency, when the rails are butted together, for the part which has been less heated to be moved out of alignment because of the fact that the parts which have been more readily heated are capable of quicker fusion. It is therefore another object of our invention to provide means which will ensure substantially uniform heating of the entire rail cross-section prior to the butting operation.

Further objects of our invention will become apparent in the following detailed description thereof.

In the accompanying drawings—

Fig. 3 is a perspective, with parts broken away and parts sectioned, of the welding machine.

Fig. 7 is a side elevation showing a modified method of delivering welded rail to track.

Fig. 8 is a view similar to Fig. 7 showing another method of delivering welded rail to track.

Fig. 9 is an enlarged plan of the rail supply car mechanism disclosed in Figs. 1a and 2a.

Figs. 10, 11 and 12 are largely diagrammatic, illustrating the theory of current distribution.

Figure 1A:
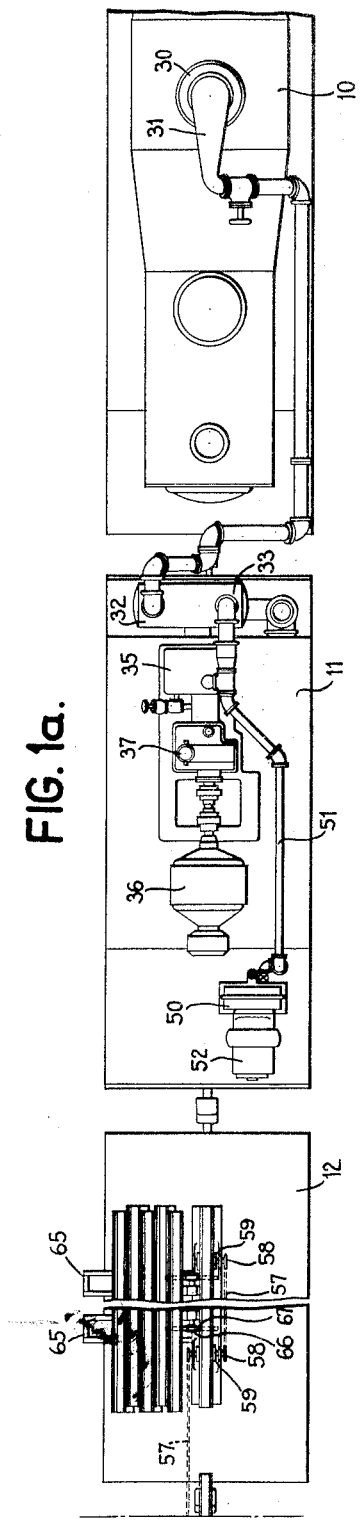
Figs. 1a, 1b, 1c, 1d, are a plan view.
Figure 2A:
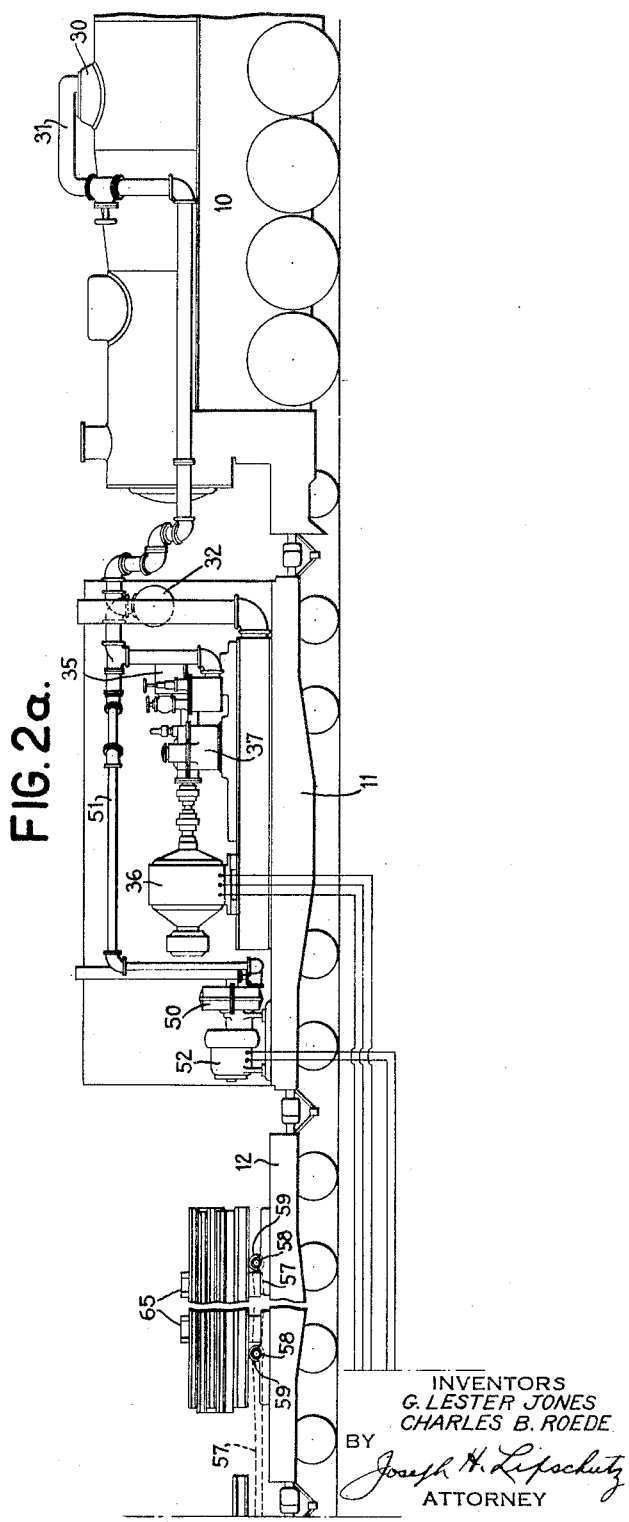
Figs. 2a, 2b, 2c, and 2d are a side elevation of four continuous sections constituting a welding train.
Figure 1B:
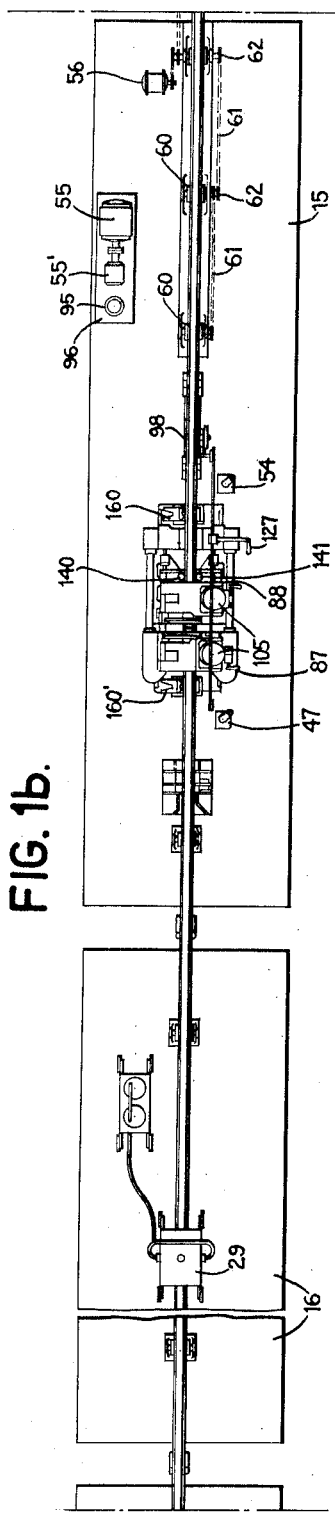
Figure 2B:
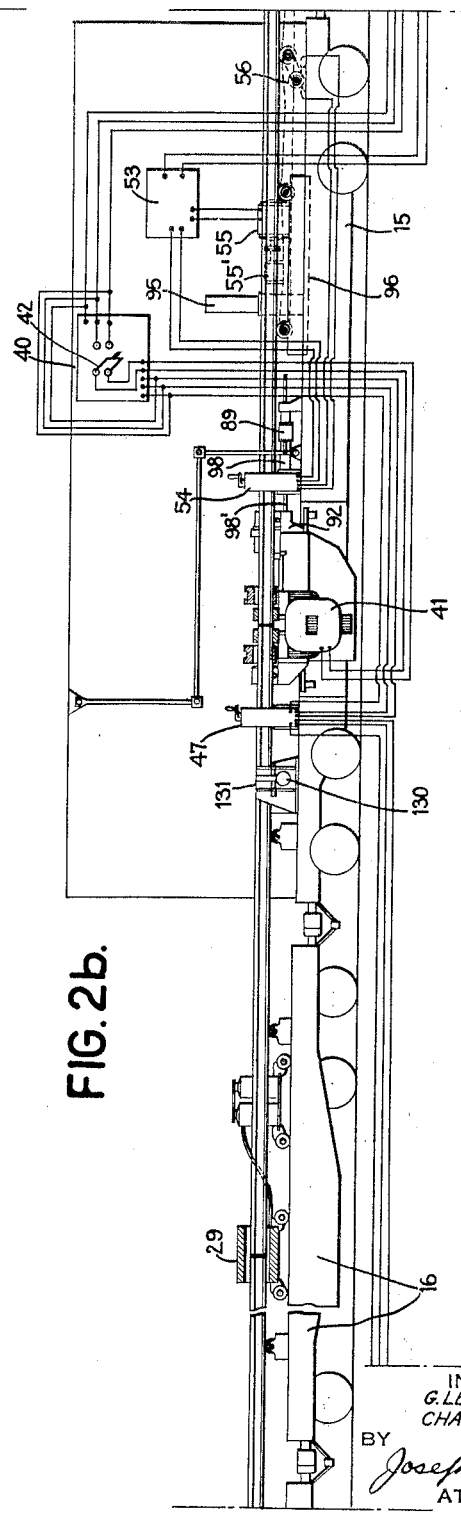
Figure 1C:
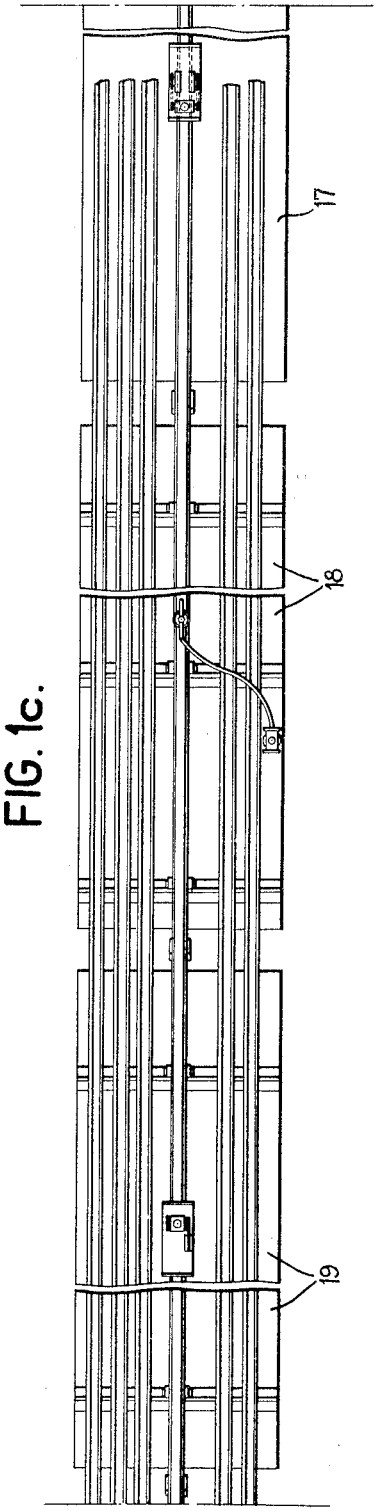
Figure 2C:
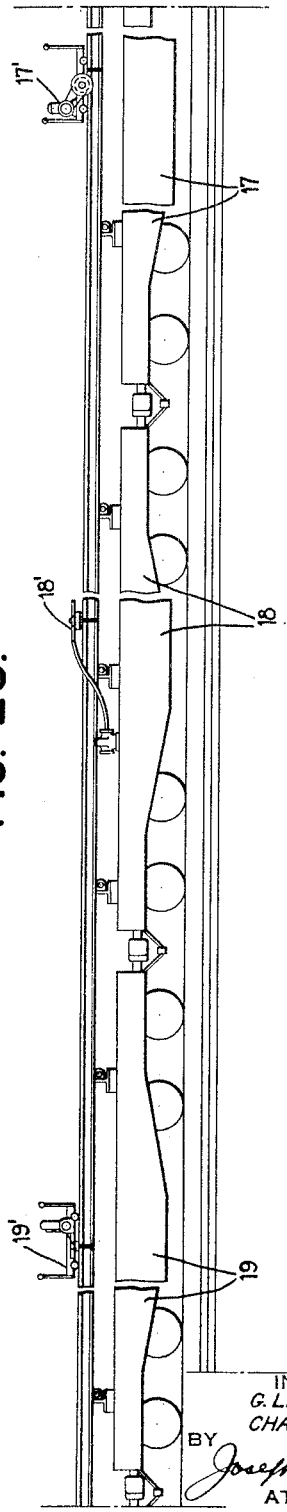
Figure 1D:
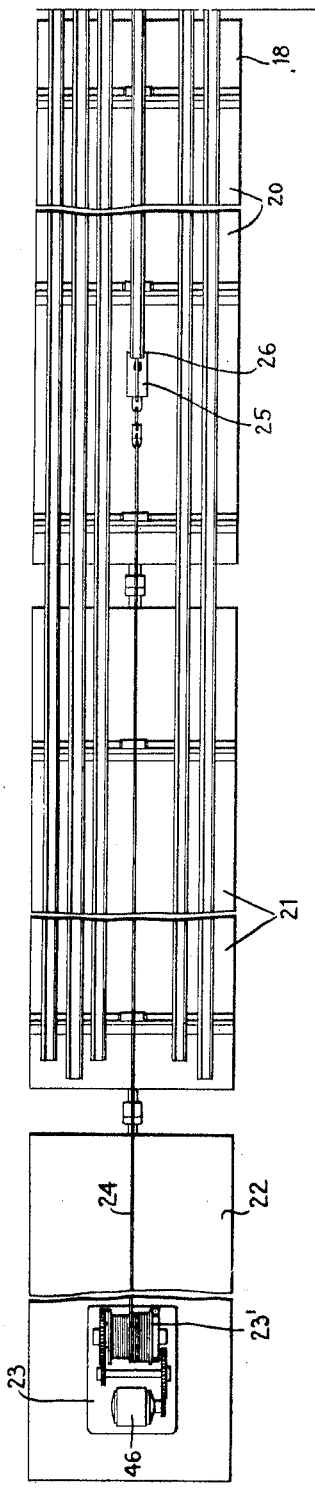
Figure 2D:
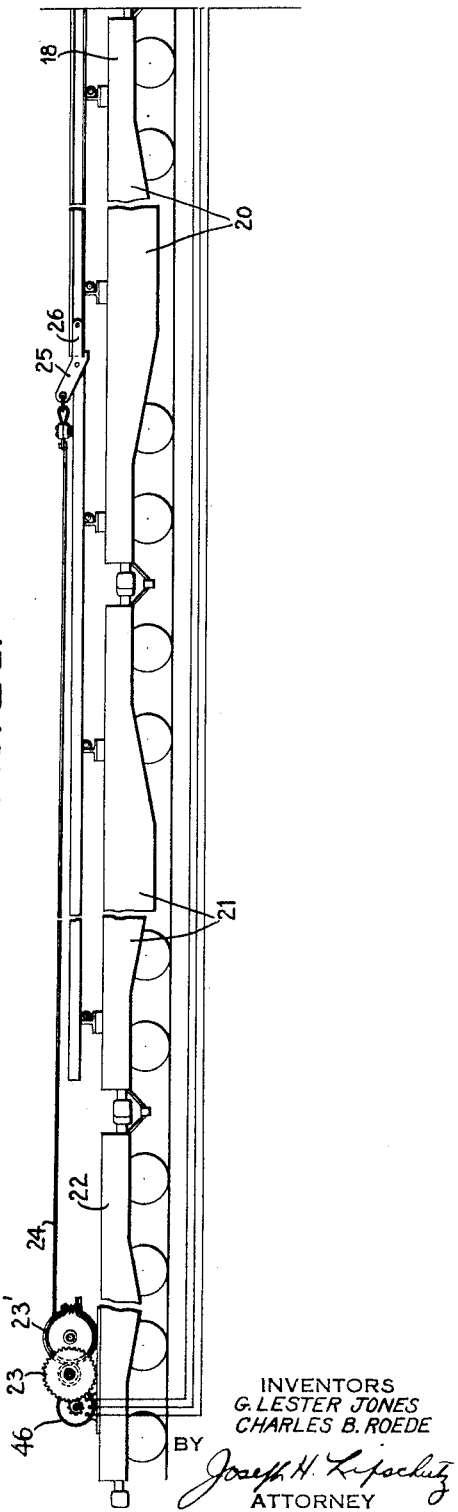

Referring to Figs. 1a, 1b, 1c, 1d and 2a, 2b, 2c, and 2d of the drawings, there is disclosed in front elevation and in plan a compflete welding train embodying our invention. The said train comprises essentially a combined traction and power generating unit which in this case consists of a locomotive 10 for generating steam with which the train is propelled and then utilizing the same for the production of power. Such utilization is effected by means of a steam-electric converter car 11 which will convert the steam into electric power for the operation of the various mechanisms employed in the welding process. While the power plant has been shown as consisting preferably of a steam locomotive and steam electric converter, as shown, for the reason that all railroads have steam locomotives already in their equipment for the purpose of propelling the trains, nevertheless these two units may be replaced by a single traction and power generating unit such as a Diesel engine. The reason such a unit as a Diesel engine is not shown as the preferable form is because such an engine must generate approximately 1000 H. P. for the operations to be described hereinafter, and the expense of such an engine must necessarily be very great, whereas in the preferred embodiment shown in the drawings, railroads may employ their ordinary steam engines which they already possess and which therefore involves no additional outlay. The next car after the power generating and converting cars is a rail supply car 12 which is designed to feed rails intro the welding line so that they may be delivered in succession, one ordinary rail length at a time, into the welding car 15 in which is mounted the welding mechanism. After the rails have been welded they are moved into the next car 16 for heat treatment by heat treating apparatus 29 mounted on such car. Such heat treatment of the welded portion is performed while the next weld is being made in the welding car 15. The next positions to which the welded rails are moved consist of a plurality of rail grinding cars 17, 18 and 19 on each of which there is mounted suitable grinding mechanism 17', 18', 19' for grinding predetermined portions of the weld. After the welded rails leave the final grinding car 19 they are moved along to a plurality of rail storage cars 20 and 21, only two, namely cars 20 and 21, of which are shown, but there will be employed a string of such cars sufficient to accommodate the longest welded rail length which the said machine is called upon to weld. Thus a string of storage cars similar to cars 20, 21 may extend for half a mile or more in length. On the final car 22 there is mounted a winch 23 upon which there operates a cable 24, one end of which is connected by suitable connecting means 25 to the leading end 26 of the welded rail length. The winch is under the control of an operator stationed in the welding car, as will be described more in detail hereinafter, so that when the weld has been formed in the welding mechanism the operator operates the winch to cause the welded rails to be drawn out of the welding car and along the succeeding cars for a distance equal to one rail length; whereupon, the operator stops the winch and the rails are held in position until the next weld has been completed, whereupon the winch will again be operated to draw the welded rail along the cars for a distance equal to another ordinary rail length.

The above sets out in brief the complete assembly which constitutes a rail welding train for the mass production of welded rails, and it will be seen that ordinary rail lengths may be continuously fed into car 12 and from said car into the welding line, and the finished lengths of welded rail of whatever length desired may be stored upon a string of storage cars 20, 21 of any desired length. The specific mechanism of each of the cars constituting the above welding train will now be described insofar as said mechanism is pertinent to the welding operation.

Starting with the traction and power generating cars, there is preferably employed an ordinary steam engine 10 of sufficient generating power to provide an output on the order of 1000 H. P. For this purpose, the locomotive has attached to the steam dome 30 thereof a connection 31 for leading the steam into a separator 32 on the steam-electric converter car 11. The steam discharges from the steam outlet 33 of the separator and enters a steam turbine 35 to operate the same. The steam turbine operates a generator 36 through reduction gearing 37. The power from the generator 36, which may be a three-phase AC generator, is led to a control panel 40 provided with a switch 42 for the transformer 41 of the rail welding machine. The said power is controlled by said switch 42 on the control panel 40 and is within reach of an operator at the welding machine. Power from the generator 36 also operates a motor 46 for driving the winch 23, the power lines for the winch motor extending through panel 40 and winch controller 47 adjacent the operator at the welding machine. The welding mechanism places a variable load on the power lines and therefore it is not advisable to use the said lines for the operation of the various auxiliary motors employed in the train. The main power lines have been shown as operating the winch motor 46, but this is because the said winch motor is operated only when the welding is completed and therefore when the power load is not variable. Also, the long distance that the winch motor is positioned away from the power source makes it advisable to use the high voltage three-phase power system. However, for operating the auxiliary motors in the car there may be provided an auxiliary turbine 50 operated from the steam supply taken from the separator by way of bypass 51, the said turbine operating the DC generator 52 from which power is taken off, and through control panel 53 is caused to operate the various auxiliary motors such as the oil pump motor 55 and motor 56 for operating the feeding of rails into the welding car. The function of the oil pump motor will be described more in detail hereinafter.

The motor 56 controlled by controller 54 operates a series of chain and pulley drives 57, 58 for operating rollers 59 upon which the rails are adapted to be fed one at a time in the rail supply car 12 so that each rail successively may be fed on to the rollers 59 and by reason of the chain and pulley drive from motor 56 may be fed into the rail welding mechanism along rollers 60 operated by chain and pulley drives 61, 62 from the motor 56. The rails are stacked in the rail car 12 on their sides on inclined guides 65 (see Figs. 1a, 2a, and 9) so that they may be fed downwardly by gravity against the stops 66 of star wheels 67. Each time the star wheel rotates through a quarter of a turn it picks up the lowermost of the rails on the incline 65 and deposits the said rail on the rollers 59. The rails are so arranged on the inclines that they are deposited in their upright position on rollers 59. For turning the star wheels through a quarter-turn there may be provided a hand-valve 70 under the control of an operator on the rail supply car 12, which controls a supply of compressed air (which may be taken off the brake line) to cylinders 71, the pistons 72 of which are connected through a ratchet mechanism 75 to the said star wheels. The operators on the car 12 may be provided also with grinding mechanisms 73 also operated by the supply of compressed air controlled by valve 70 which may be a four-way valve, so that the operator may use said valve for the purpose of operating the star wheels or the grinding mechanism, at will. The said grinding mechanism may be employed to clean the ends of the rail in position on rollers 59 while said rail is waiting to be moved into the welding car.

The movement of the rail into the welding car is under the control of the operator by way of controller 54 adjacent the operator. In starting the welding operation, the operator operates controller 54 which energizes motor 56 to cause the rail which is in position on the rollers 59 to enter the rail welding car past suitable guides through the welding machine until the right-hand end thereof is in welding position. This means that the left-hand end of the first rail is projecting outwardly from the welding car. Since this is the leading end of what is to be a long welded rail length, there is attached to this end by clamp devices 25 and 26 one end of the cable 24 which is adapted to be wound upon the drum 23' of winch 23.

The welding machine itself is disclosed in Figure 3 and comprises fixed guides 90 upon which the welding machine may be operated axially of the rail length. For this purpose the welding machine is provided with brackets 91 fixed to the main casting 92 of the welding machine so that the said welding machine may slide along the fixed slides 90. The various movements of the welding machine proper and the parts thereof are designed to be effected by fluid under pressure, preferably by oil under pressure, and for this reason there is provided the oil pump motor 55 which operates an oil pump 55' which takes oil from tank 96 and delivers it under pressure to an accumulator 95 for storing energy and also delivers it direct to the operating line. Oil in said line is designed to be controlled by a valve 89 which may be operated by linkage 76, 77, 78 and which will cause said oil under pressure to be applied to a cylinder 98, the piston-rod 98' of which is connected to the main casting 92 of the welding machine so that the said main casting, and therefore the welding machine, may be moved bodily in one direction or the other in order to position the same with respect to the end of the rail in welding position. Not only does this longitudinal movement of the welding machine permit the machine to be moved relative to the rail ends, but it also permits the rail to be moved together with the machine by means of the clamping mechanism which causes the said rail end and machine to move integrally. Thus, if the rail end has moved too far through the welding machine it is possible for the welding machine to grip the said rail and by reason of the oil pressure system just described to move the rail back into welding position. When the first rail has been moved to welding position with its leading end projecting out of the welding machine and the right-hand end in welding position, the operator operates valve 87 to admit fluid under pressure by way of fluid pressure inlets 100 to a cylinder 101 to move a piston-rod carrying a die 102 into engagement with one side of the rail. The other side of the rail is in engagement with a fixed die 103. When the rail has been gripped between clamps 102 and 103, fluid under pressure is designed to pass by way of a bypass 104 into a cylinder 105 to cause a piston-rod 106 to be forced downwardly to operate a toggle 107, 108, the latter member carrying a die or clamp 110 adapted to engage the same side of the rail as clamp 102, but with much greater force. The clamp 102 is only for the purpose of positioning the rail, but the clamp 110, coacting with the extension of fixed die 103, is for the purpose of gripping the rail so firmly that the said rail will not slip when the rails are moved into butting engagement for the purpose of forming the weld. After the piston within cylinder 105 is moved past an outlet 111, fluid under pressure is permitted to move through a by-pass 112 into a cylinder 113 to cause a piston rod 114 to be moved outwardly and operate a lever 116 the other end of which carries a contact pad 117 adapted to engage the top of the rail.

One of the rails which will form the weld has thus been properly positioned and firmly gripped by the gripping dies as well as firmly engaged by the electric contact 117. The operator then operates controller 54 which controls motor 56 to cause the rail which is in position on rollers 59 to travel into the welding car until the left-hand end of said rail engages the right-hand end of the preceding rail. The operator then operates valve 88 which admits fluid under pressure to cylinders 101', 105', and 114' to cause a positioning die (not shown) similar to 102, gripping die 110', and electrode 117' to be applied to the left-hand end of the second rail in the same sequence as hereinbefore described.

Figure 6:
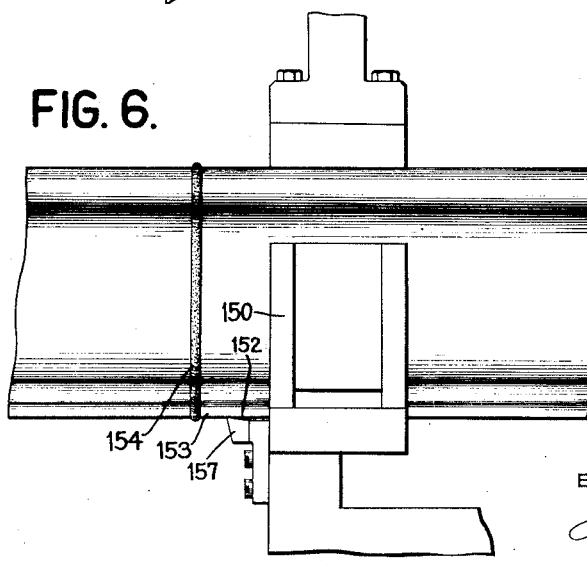
Fig. 6 is a side elevation, partly sectioned, showing the shearing mechanism.

The rail ends are now in position for the welding operation. The frame 121 is moved back (by mechanism described hereinafter) to separate the rail ends and the operator closes switch 42 through the transformer 41. Then the frame 121 is moved so as to bring the rail ends in contact to cause the current to pass through the adjacent ends of the rail. In this operation metal will be burned away from the adjacent ends of the rails and it is necessary to feed up the right-hand rail as the said metal burns away. Also, in order to prevent sticking of the ends with consequent drops of voltage which will impair the flashing operation, it is necessary at times to move the right-hand rail away from the left-hand rail momentarily and then continue the feeding up of the rail as the metal flashes away. For these purposes, the main casting 92 of the welding machine is provided with guides 120 upon which the frame 121 may slide. Upon the said main casting 92 there are mounted push-up cylinders 125 having piston-rods 126 to which the cylinders 101', 105', 114' and their accompanying mechanism are connected so that they move therewith. Fluid under pressure supplied to the push-up cylinders may therefore move the pistons 126 to the right or left to cause the right-hand rail to be moved toward or away from the left-hand rail in the feeding operation described above. For controlling the supply of fluid under pressure there may be provided a four-way valve 127 in the oil pressure pipe-line. The right-hand rail is continuously fed up to the left-hand rail as the flashing continues, with an occasional retraction of the right-hand rail until the ends of the rail are ready for welding, whereupon valve 127 is actuated to cause the push-up cylinders to move the right-hand rail firmly into engagement with the left-hand rail to effect the weld. The gripping members 110 and 110' hold the rails firmly against axial movement during the push-up operation when relatively great forces are present which would otherwise tend to cause the rail to slip. When the weld has been completed, all of the clamps 101', 110', and 117' are released and the valve 127 is operated by the operator for admitting fluid under pressure into the push-up cylinders 125 to cause the pistons 126 and the entire mechanism supported thereby, including frame 121, the cylinders 101', 105', 114' to be moved forward as a unit relative to the weld, which remains gripped in position by the gripping members 102, 110, 117. The forward plate 150 of the said moving frame is provided with a cutting edge 151 (see Fig. 6) positioned so that the top surface 152 thereof is on a level with the bottom 153 of the rail. As the framework moves forward, the said cutting edge 152 will shear the bottom portion 154 of the bead or flash from the weld. If desired, similar shearing mechanism may be provided to shear other parts, or all, of the bead or flash during the same operation. After this has been performed, the push-up cylinders 125 may be controlled to withdraw the frame-work to original position. Thereupon the clamps 102, 110 and 117 are released and the welded rail is ready to be withdrawn from the welding machine and moved along toward the storage cars.

After the above flash-removal step is completed, the operator operates winch control 47 which controls the winch motor 46 to cause the winch to be operated in a direction to wind up the cable so that the welded rail length is withdrawn from the welding car. The operator watches the rails moving through the machine and when the right-hand end of the second rail is approaching the welding position he throws off the winch controller 47, which stops the winch and operates a solenoid valve 130 which controls a supply of air pressure to an air pressure operated brake 131 located as close as convenient to the welding machine to cause the second rail to be gripped and held firmly in position. In the event that the second rail is moved too far to the left, that is, beyond the proper welding position, then the operator can, after he has applied the gripping members 102, 110 and 117, release the solenoid valve 130 by a switch (not shown) on the winch controller 47, and then operate valve 89 for moving the entire machine toward the right on the rigid slides 90 until the rail is in the proper welding position. Then the operator operates controller 54 to operate motor 56 and move the next rail over rollers 59 into the welding machine until the left end of the new rail abuts against the right end of the rail held gripped in welding position. The operation is then repeated.

When the rail enters the welding machine, it is guided into position by various guiding means which may take the form of a fixed roller 140 and a spring pressed roller 141 mounted on vertical axes and adapted to cooperate with the respective sides of the rail. The rail operates over bed-plates 143 which act as a horizontal guide, the rails being held out of contact with the bed-plates by means of rollers 144 spring-pressed upwardly, so that the rails are prevented from damaging the bed-plates. The rollers 140 and 141 act as vertical guides. The fixed die 103 also acts as a guide.

Referring to Figs. 10, 11 and 12, there is illustrated the theory underlying a novel feature of our invention. Referring first to Fig. 10, it will be seen that if alternating current is passed through the rail from top to bottom, there is a tendency for the current to spread out along the curved dotted line shown, resulting in a greater concentration of current near the base than at the head by reason of the fact that the web and base present a much larger area than the head. Therefore, when the weld is formed by butting the ends together, it is found that the web and base yield more readily than the head and there results a push-up or camber effect, as shown in Fig. 11. This is undesirable and is avoided in our invention by reason of the fact that current is not sent vertically through the rails but is confined substantially to the upper portion of the rails. For this purpose, we insulate the base of the rail by insulation 143' provided in the base-plates 143 so that current cannot pass through the rail vertically. Therefore the current is confined mainly to a path from current clamp 117 through the head of one rail to the head of the next rail and out by way of current clamp 117'. By insulating the base of the rails, therefore, the current path is confined mainly to the head of the rail but will tend to spread through the web and base and by reason of the greater area of the web and base there will result a substantially uniform current distribution, as indicated by the vertical dotted lines in Fig. 12. Therefore, when the butting operation takes place to form the weld, all parts of the rail cross-section will yield substantially equally and no push-up or camber effect will result.

While the rails are held in welding position on bed-plates 143, it has nevertheless been found to be the case that the cross sections of the rails vary to such extent that considerable time must be consumed in adjusting the positions of the rail ends by shims or similar means in order that the rail ends shall be in alignment when the weld has been formed. This, however, is a time-consuming operation and considerably cuts down the efficiency of the welding operation and increases the cost. Therefore we have worked out the following method for feeding rails into the machine, which will not require the use of shims or any loss of time in adjusting the rails so that the sections meet and are aligned when welded. We have accomplished this result by seeing that the rails are so positioned on the rack car 12 that when fed from rollers 59 into the welding car and the welding mechanism, all of the rails are positioned with the "brand" side adjacent the fixed dies 103. Since the base of the rail and the web surface on which the brand appears are formed by one roll in the mill it follows that the location as regards angularity and displacement of these surfaces relative to each other is more accurate than the location of the opposite side of the web with respect to the base, because the latter side is formed by a roller whose position with respect to the base can be varied. Since alignment is determined vertically from the bases and laterally from the web, it follows that for most accurate alignment we must locate the rail laterally from that side which was rolled by the roller which forms both the web and said side, and we must therefore feed the rails into the machine so that said side is adjacent to the fixed dies 103. Therefore, if the rails are placed with the side which was rolled simultaneously with the base by the same roller always in engagement with the fixed dies it is found that there is much less tendency toward disalignment and that after the welds are formed there is no appreciable disalignment.

Figure 4:
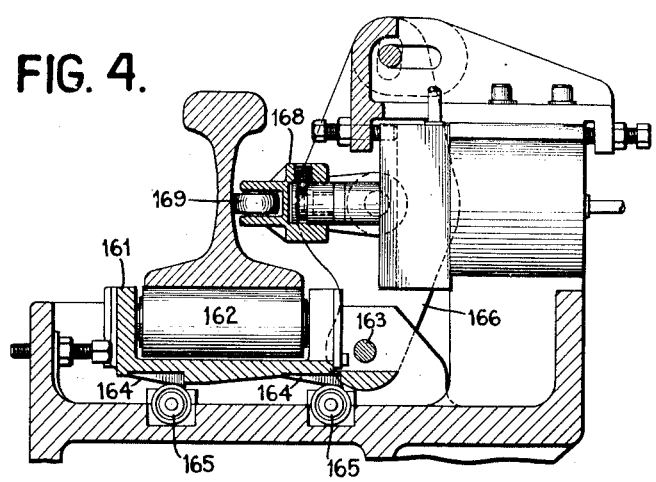
Fig. 4 is a vertical section through the mechanism for causing the rail to clear the bottom and side dies.
Figure 5:
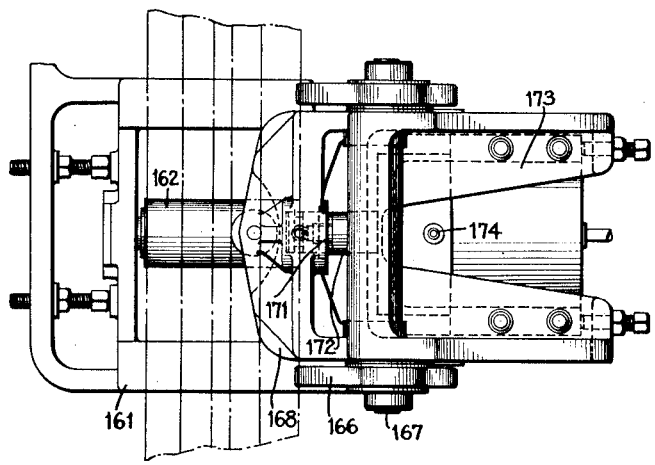
Fig. 5 is a plan view of the Fig. 4 device.

It will be appreciated that when the weld has been formed a certain amount of metal will be extruded completely around the cross-section of the rails at the welded portion. Although the flash has been sheared from the bottom and perhaps other surfaces, there are projections of metal which would injure the base plate if they were drawn over it. These projections will seriously interfere with the movement of the rail through the machine past the horizontal bed-plate 143 and the fixed die 103. The other side of the rail and the top of the rail are free and do not have closely cooperating portions since the movable dies 102, 110 and clamp 117 are all moved away from the rail after the weld is completed. In order that the welded portion of the rail shall clear plate 143 and fixed die 103, it is necessary to move the rail in a direction away from die 103 and upwardly from plate 143 for a distance sufficient to cause all projections of the weld to clear said die and plate. For this purpose there may be provided at a position indicated generally in the assembly view by the numeral 160, and in detail in Figs. 4 and 5, a movable frame 161 having a roller 162 journaled therein over which the rail is adapted to travel and on which the rail rests when in the welding position. The said frame 161 may be supported by means of cam members 164 on its lower surface engaging a plurality of rollers 165 fixed in the base of the machine with the axes of the rollers longitudinal of the rail. It will be seen that when the frame 161 is moved toward the left in Fig. 4 the cams 164 will ride up on rollers 165 to lift the frame and the rail vertically. Thus, if means are provided whereby the frame can be moved to the left, then the rail will be moved upwardly and to the left, which is the desired position of the rail before being moved through the machine so that the welding flash or bead or any projections will clear the fixed dies and the bed-plate. For moving the frame 161 to the left, said frame may be pivotally connected at 163 to end links 166 which are pivotally connected at 167 to a yoke member 168 adapted to engage the web of the rail by means such as roller 169. Said yoke member 168 is adapted to be operated to the right or left by reason of a connection 171 with a piston rod 172 acting within a cylinder 173 which has a connection 174 for admitting oil under pressure under the control of valve 88 so that when valve 88 is operated to release the pressure clamps and the current clamps, oil under pressure is admitted to cylinder 173 to move frame 161 to the left in Fig. 4 to cause the rail to be lifted and moved toward the left. This will cause any projections on the rail section to clear the base-plate and the fixed dies without danger of scoring the same. By reference to Fig. 1b it will be seen that there are two such elements, 160 and 160' at opposite ends of the welding machine adapted to be controlled by the operation of valves 87 and 88. These are duplicates of each other and each will cooperate with the respective rail end.

As hereinbefore described, the invention is designed to produce welded rail lengths which are delivered to the place where they are to be put into track, and these welded rail lengths are then joined by a weld made in any suitable manner in track. To obviate the necessity for such welds in track, we may modify our invention to provide in place of formation of welded rail lengths which are delivered to storage cars, a single continuous welded rail which may be fed off the end of the welding train as shown in Figs. 7 and 8 either directly into track or adjacent to the position where the rail is to be laid. For this purpose, the extreme leading end of the rail may be fastened in any suitable manner as by clamps 180 to the ties or the rail in track, as shown, and the welding train will move one rail length after each weld is completed. In the modified arrangement shown in Fig. 8, the winch mechanism 46, 23, 23' of Fig. 2d may be mounted on the ground a predetermined distance from the welding train or mechanism, and the rail may be withdrawn one rail length at a time from the stationary train or mechanism. In the forms of the invention shown in Figs. 7 and 8 the welding train will not include storage cars or a winch car.

In accordance with the provisions of the patent statutes, we have herein described the principle and operation of our invention, together with the apparatus which we now consider to represent the best embodiment thereof, but we desire to have it understood that the apparatus shown is only illustrative and that the invention can be carried out by other equivalent means. Also, while it is designed to use the various features and elements in the combination and relations described, some of these may be altered and others omitted without interfering with the more general results outlined, and the invention extends to such use.

Having described our invention, what we claim and desire to secure by Letters Patent is:

1. A mobile rail welding train adapted to travel along a railroad track, said train comprising a combined traction and power-generating unit for hauling the train and providing power for the welding operation, a rail supply car, a welding car having a rail welding mechanism mounted thereon, means for feeding rails from said supply car to said mechanism, means for supplying power from said unit to said mechanism, a plurality of flat cars for storing the lengths of welded rail, and means for moving the welded rail from said mechanism to said flat cars, said last-named means including a winch and a cable, said cable being connected at one end to said winch and at the other end to the leading end of the welded rail.

2. A mobile rail welding train adapted to travel along a railroad track, said train comprising a combined traction and power-generating unit for hauling the train and providing power for the welding operation, a rail supply car, a welding car having a rail welding mechanism mounted thereon, means for feeding rails from said supply car to said mechanism, means for supplying power from said unit to said mechanism, a plurality of flat cars for storing the lengths of welded rail, means for moving the welded rail from said mechanism to said flat cars, said last-named means including a winch and a cable, said cable being connected at one end to said winch and at the other end to the leading end of the welded rail, and means whereby said winch is controlled by an operator positioned at the winding mechanism.

3. A mobile rail welding train adapted to travel along a railroad track, said train comprising a combined traction and power-generating unit for hauling the train and providing power for the welding operation, a rail supply car, a welding car having a rail welding mechanism mounted thereon, means for feeding rails from said supply car to said mechanism, means for supplying power from said unit to said mechanism, a plurality of flat cars for storing the lengths of welded rail, means for moving the welded rail from said mechanism to said flat cars, said last-named means including a winch and a cable, said cable being connected at one end to said winch and at the other end to the leading end of the welded rail, and means for continuously applying a predetermined amount of braking force to said winch.

4. A mobile rail welding train adapted to travel along a railroad track, said train comprising a combined traction and power-generating unit for hauling the train and providing power for the welding operation, a rail supply car, a welding car having a rail welding mechanism mounted thereon, means for feeding rails from said supply car to said mechanism, means for supplying power from said unit to said mechanism, a plurality of flat cars for storing the lengths of welded rail, means for moving the welded rail from said mechanism to said flat cars, said last-named means including a winch and a cable, said cable being connected at one end to said winch and at the other end to the leading end of the welded rail, and means for continuously applying a predetermined amount of braking force to said winch of such degree that predetermined tension in the cable may unwind the winch and winding of the winch may overcome said force.

5. A mobile rail welding train adapted to travel along a railroad track, said train comprising a combined traction and power-generating unit for hauling the train and providing power for the welding operation, a rail supply car, a welding car having a rail welding mechanism mounted thereon, means for feeding rails from said supply car to said mechanism, means for supplying power from said unit to said mechanism, a plurality of flat cars for storing the lengths of welded rail, and means on the last of said flat cars for moving the welded rail lengths from said welding mechanism to the flat cars, said last named means including a winch and a cable, said cable being connected at one end to said winch and at the other end to the leading end of the welded rail.

6. A mobile rail welding train adapted to travel along a railroad track, said train comprising a steam locomotive for hauling the train and generating power for the welding operation, a steam-electric converter car, a rail supply car, a welding car having a rail welding mechanism mounted thereon, means for feeding rails from said supply car to said mechanism, means for supplying power from said converter car to said welding mechanism, a plurality of flat cars for storing the lengths of welded rail, a winch car having a winch mounted thereon, and a cable connected at one end to said winch and at the other end to the length of welded rail for moving said rail to the flat cars.

7. A mobile rail welding train adapted to travel along a railroad track, said train comprising a combined traction and power-generating unit for hauling the train and providing power for the welding operation, a rail supply car, a welding car having a rail welding mechanism mounted thereon, means for feeding rails from said supply car to said mechanism, means for supplying power from said unit to said mechanism, means for moving the welded rail out of the welding mechanism, a heat treating car having heat treating mechanism thereon for heat treating the welds after leaving said welding mechanism, a plurality of flat cars for storing the lengths of welded rail, a winch car having a winch mounted thereon, and a cable connected at one end to said winch and at the other end to the length of welded rail for moving said rail out of the welding mechanism to said heat treating and storage flat cars.

8. In a rail welding machine comprising a supporting base and fixed dies, the rails to be welded being adapted to be supported on said base and against said dies, means for heating to welding temperature the adjacent ends of said rails, means for pressing said ends together to form the weld and cause the formation of a bead of extruded metal outside the weld, means for withdrawing the welded rail from said machine, and means for actuating the welded rail in a direction away from said base and said dies and to the extent necessary to cause said bead to clear said base and said dies when the welded rail is withdrawn.

9. In a rail welding machine comprising a supporting base and fixed dies, the rails to be welded being adapted to be supported on said base and against said dies, current clamps adapted to engage adjacent ends of the rails to be welded, gripping clamps adapted to engage said rails to lock the same against movement relative to said supporting base, means controlled by an operator for applying and releasing said current and said gripping clamps, means for butting said ends together to form the weld, said butting operation causing the formation of a bead of extruded metal outside the weld, means for withdrawing the welded rail from said machine, means for actuating the welded rail in a direction so that said bead clears said dies when the welded rail is withdrawn, and means whereby said preceding means is rendered effective when the operator releases said clamps.

G. LESTER JONES.
CHARLES B. ROEDE.